(12) United States Patent
Surace et al.

(10) Patent No.: US 10,415,407 B2
(45) Date of Patent: Sep. 17, 2019

(54) AIRFOIL PIECES SECURED WITH ENDWALL SECTION

(71) Applicant: United Technologies Corporation, Farmington, CT (US)

(72) Inventors: Raymond Surace, Newington, CT (US); Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 372 days.

(21) Appl. No.: 15/354,161

(22) Filed: Nov. 17, 2016

(65) Prior Publication Data

US 2018/0135445 A1    May 17, 2018

(51) Int. Cl.

| | |
|---|---|
| *F01D 5/14* | (2006.01) |
| *F01D 9/04* | (2006.01) |
| *F02C 3/04* | (2006.01) |
| *F01D 25/00* | (2006.01) |
| *F04D 29/38* | (2006.01) |

(Continued)

(52) U.S. Cl.
CPC .............. *F01D 9/042* (2013.01); *F01D 5/141* (2013.01); *F01D 5/147* (2013.01); *F01D 5/187* (2013.01); *F01D 5/282* (2013.01); *F01D 9/041* (2013.01); *F01D 25/005* (2013.01); *F01D 25/12* (2013.01); *F02C 3/04* (2013.01); *F04D 29/388* (2013.01); *F05D 2220/32* (2013.01); *F05D 2230/60* (2013.01); *F05D 2240/12* (2013.01); *F05D 2240/126* (2013.01); *F05D 2240/303* (2013.01); *F05D 2240/304* (2013.01); *F05D 2260/30* (2013.01); *F05D 2300/20* (2013.01);

(Continued)

(58) Field of Classification Search
CPC ........ F01D 9/042; F01D 25/005; F01D 5/025; F01D 5/30; F04D 29/322; F04D 29/34; F04D 29/388
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |

(Continued)

FOREIGN PATENT DOCUMENTS

| | | |
|---|---|---|
| EP | 0764764 | 3/1997 |
| EP | 1764481 | 3/2007 |

(Continued)

OTHER PUBLICATIONS

European Search Report for European Patent Application No. 17202238.6 completed Mar. 6, 2018.

(Continued)

*Primary Examiner* — Jacob M Amick
(74) *Attorney, Agent, or Firm* — Carlson, Gaskey & Olds, P.C.

(57) ABSTRACT

An airfoil includes an airfoil section that defines an airfoil profile, and a first endwall section with which the airfoil section is attached. First and second airfoil pieces form different portions of the airfoil profile. The first and second airfoil pieces include respective first ends. The first ends interlock with the first endwall section such that the first and second airfoil pieces are retained with the first endwall section.

17 Claims, 4 Drawing Sheets

(51) Int. Cl.
*F01D 5/18* (2006.01)
*F01D 5/28* (2006.01)
*F01D 25/12* (2006.01)

(52) U.S. Cl.
CPC ..... *F05D 2300/6033* (2013.01); *Y02T 50/672* (2013.01); *Y02T 50/673* (2013.01); *Y02T 50/676* (2013.01)

(56) References Cited

U.S. PATENT DOCUMENTS

| | | | |
|---|---|---|---|
| 4,247,259 A | 1/1981 | Saboe et al. |
| 4,396,349 A | 8/1983 | Hueber |
| 4,914,794 A | 4/1990 | Strangman |
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 2006/0228211 A1* | 10/2006 | Vance ............... F01D 5/14 415/200 |
| 2008/0159850 A1 | 7/2008 | Tholen et al. |
| 2010/0080687 A1* | 4/2010 | Vance ............... F01D 5/147 415/115 |
| 2010/0124502 A1 | 5/2010 | Brandl et al. |
| 2010/0136258 A1 | 6/2010 | Strock et al. |
| 2013/0251536 A1 | 9/2013 | Mironets et al. |
| 2016/0090851 A1 | 3/2016 | Carr et al. |

FOREIGN PATENT DOCUMENTS

| | | |
|---|---|---|
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |
| WO | 2015108592 | 7/2015 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

AIRFOIL PIECES SECURED WITH ENDWALL SECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile, a first endwall section with which the airfoil section is attached, and first and second airfoil pieces. The first airfoil piece forms a portion of the airfoil profile and the second airfoil piece forms another, different portion of the airfoil profile. The first and second airfoil pieces includes respective first ends. The first ends interlock with the first endwall section such that the first and second airfoil pieces are retained with the first endwall section.

A further embodiment of any of the foregoing embodiments includes a second endwall section. The first and second airfoil pieces include respective second ends opposed from the respective first ends, and the second ends interlock with the second endwall section.

In a further embodiment of any of the foregoing embodiments, the first endwall section includes a cavity, and the first ends are disposed in the cavity.

In a further embodiment of any of the foregoing embodiments, the cavity is divided into a plurality of sub-cavities, and the respective first ends are disposed in different sub-cavities.

In a further embodiment of any of the foregoing embodiments, the first airfoil piece forms a leading end of the airfoil profile, and the second airfoil piece forms at least one of a trailing end, a pressure side, or a suction side of the airfoil profile.

A further embodiment of any of the foregoing embodiments includes a bias member between the first airfoil piece and the first endwall section.

In a further embodiment of any of the foregoing embodiments, the first endwall section includes a sub-cavity retaining the bias member.

In a further embodiment of any of the foregoing embodiments, one of the first airfoil piece or the first endwall section includes a lip and the other of the first airfoil piece or the first endwall section includes a shoulder that abuts the lip such that an exterior airfoil surface of the first airfoil piece is substantially flush with an exterior endwall surface of the first endwall section.

A further embodiment of any of the foregoing embodiments includes a second endwall section and a tension member extending through one of the first or second airfoil pieces. The tension member secures the first and second endwall sections together.

A further embodiment of any of the foregoing embodiments includes a second endwall section and plurality of tension members. Each tension member extends through one of the first or second airfoil pieces. The tension members secure the first and second endwall sections together.

In a further embodiment of any of the foregoing embodiments, the first airfoil piece is formed of ceramic or a ceramic matrix composite and the second airfoil piece is formed of metal.

In a further embodiment of any of the foregoing embodiments, the first airfoil piece forms a leading end of the airfoil profile. The second airfoil piece forms at least one of a trailing end, a pressure side, or a suction side of the airfoil profile, and the first and second airfoil pieces are each hollow.

A further embodiment of any of the foregoing embodiments includes a second endwall section. The first and second airfoil pieces include respective second ends opposed from the respective first ends. The second ends interlock with the second endwall section. The first endwall section includes a cavity. The cavity is divided into a plurality of sub-cavities. The respective first ends are disposed in different sub-cavities. The first airfoil piece forms a leading end of the airfoil profile. The second airfoil piece forms at least one of a trailing end, a pressure side, or a suction side of the airfoil profile. The first airfoil piece is formed of ceramic. The second airfoil piece is formed of metal, and the first and second airfoil pieces are each hollow.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section defining an airfoil profile, a first endwall section with which the airfoil section is attached, and first and second airfoil pieces. The first airfoil piece forms a portion of the airfoil profile and the second airfoil piece forms another, different portion of the airfoil profile. The first and second airfoil pieces includes respective first ends. The first ends interlock with the first endwall section such that the first and second airfoil pieces are retained with the first endwall section.

A further embodiment of any of the foregoing embodiments includes a second endwall section. The first and second airfoil pieces include respective second ends opposed from the respective first ends. The second ends interlocking with the second endwall section.

In a further embodiment of any of the foregoing embodiments, the first endwall section includes a cavity, and the cavity is divided into a plurality of sub-cavities, and the respective first ends are disposed in different sub-cavities.

In a further embodiment of any of the foregoing embodiments, the first airfoil piece is formed of ceramic or ceramic matrix composite and the second airfoil piece is formed of metal.

In a further embodiment of any of the foregoing embodiments, the first airfoil piece forms a leading end of the airfoil profile. The second airfoil piece forms at least one of a trailing end, a pressure side, or a suction side of the airfoil profile, and the first and second airfoil pieces are each hollow.

In a further embodiment of any of the foregoing embodiments, one of the first airfoil piece or the first endwall section includes a lip and the other of the first airfoil piece or the first endwall section includes a shoulder that abuts the lip such that an exterior airfoil surface of the first airfoil piece is substantially flush with an exterior endwall surface of the first endwall section.

A method of assembling an airfoil according to an example of the present disclosure includes securing first and second airfoil pieces with at least a first endwall section to form an airfoil section. The airfoil section has an airfoil profile. The first airfoil piece defines a portion of the airfoil profile and the second airfoil piece defines another, different portion of the airfoil profile. The first and second airfoil pieces include respective first ends. The securing includes interlocking the first ends with the first endwall section

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
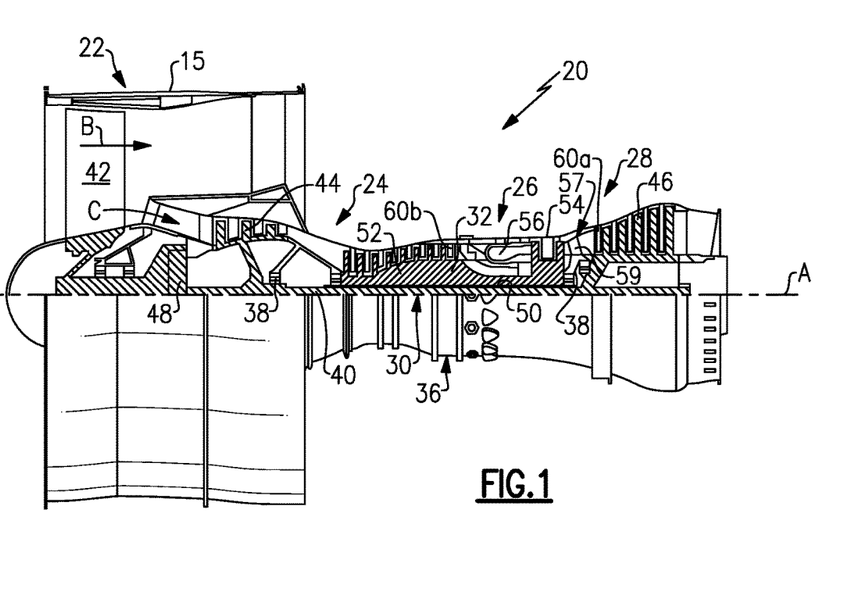
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

In addition, gas turbine engine operational capability, and the overall efficiency as measured by way of thrust specific fuel consumption (TSFC), may be improved by tailoring the overall pressure ratio of the engine at specific operating conditions via the use of variable area turbine vanes. For example, increasing the flow area of a high pressure turbine variable vane row by rotating some or all of the first stage high pressure turbine vanes to a more open position reduces the engine overall pressure ratio, reducing the high pressure compressor exit temperature, and will permit more fuel to be burned and the aircraft to fly faster. In another example, reducing the flow area of a high pressure turbine variable vane row by rotating some or all of the first stage high pressure turbine vanes to a more closed position increases the engine overall pressure ratio, thus increasing the thermal efficiency of the engine core, allowing the engine to burn less fuel while the aircraft cruises at subsonic speeds.

Figure 2:
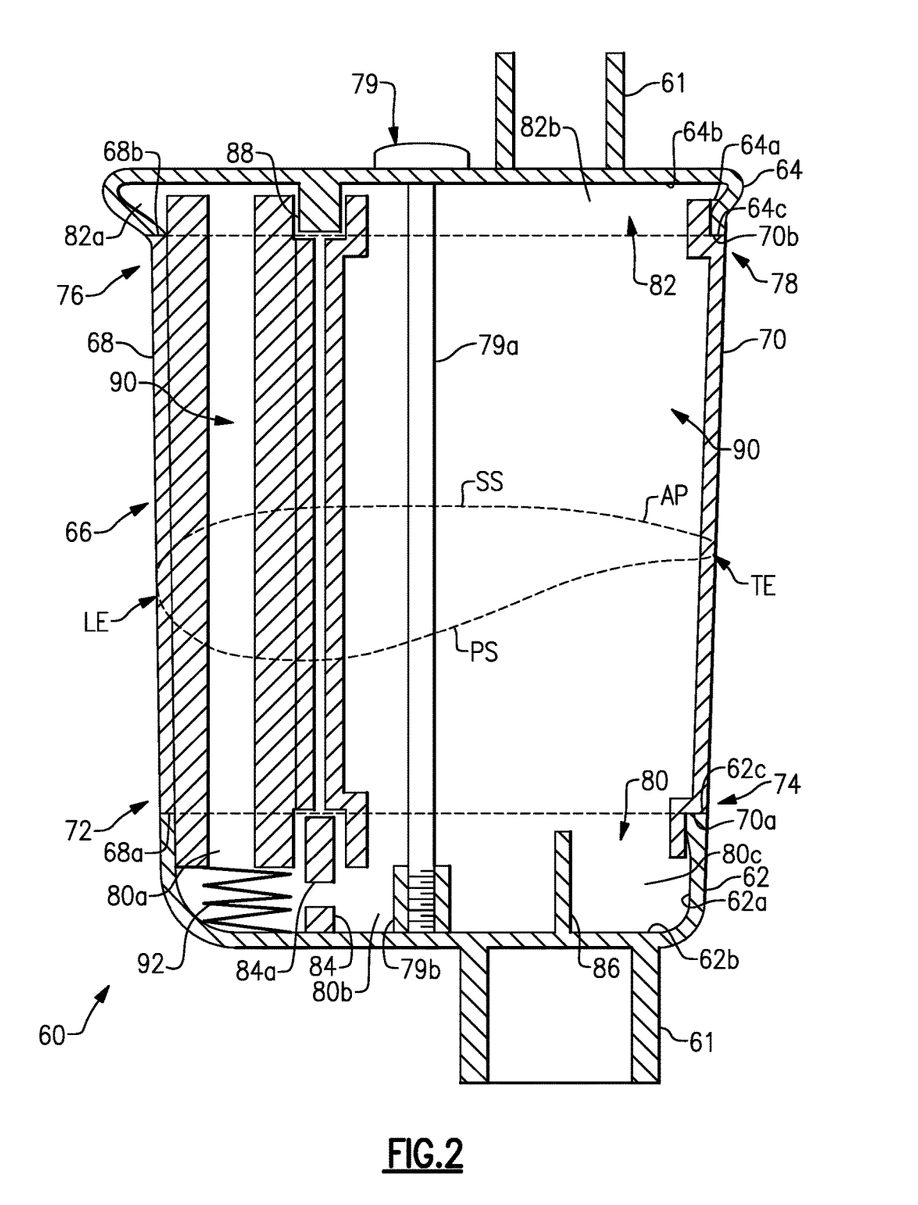
FIG. 2 illustrates an example airfoil in the gas turbine engine.

FIG. 2 illustrates an example airfoil 60 used in the engine 20. For instance, the airfoil 60 can be a turbine vane, as represented at 60a in FIG. 1, or a compressor vane, as represented at 60b in FIG. 1. In this example, the airfoil 60 is a turbine variable vane that can be pivoted about trunnions 61, but the airfoil 60 could alternatively be a static vane. As will be appreciated, although the examples herein are described in the context of a vane, this disclosure is not limited to vanes, and the examples may also be applicable to blades or other airfoils that are exposed to high temperatures.

In this example, the airfoil 60 includes first and second endwall sections 62/64 and an airfoil section 66 that is positioned radially between the endwall sections 62/64. The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The airfoil 60 also includes first and second airfoil pieces 68/70. The first and second airfoil pieces 68/70 form different portions of the airfoil profile AP. In this example, the first airfoil piece 68 forms the leading end (LE) of the airfoil profile AP, and the second airfoil piece 70 forms the trailing end (TE), the pressure side (PS), and the suction side (SS) of the airfoil profile AP. It is to be understood that although the two airfoil pieces 68/70 are shown and form the complete airfoil profile AP, the airfoil pieces 68/70 could alternatively form less than the complete airfoil profile and that one or more additional airfoil pieces could be provided to form the remaining portion of the airfoil profile AP.

The first and second airfoil pieces 68/70 include respective first ends 72/74 that interlock with the first endwall section 62 such that the first and second airfoil pieces 68/70 are retained with the first endwall section 62. In this example of the airfoil 60 as a vane, the first and second airfoil pieces 68/70 also include respective second, opposed ends 76/78. The second ends 76/78 also interlock with the second endwall section 64. If the airfoil 60 were instead a blade, the airfoil 60 would not have the second endwall section 64 and the first and second airfoil pieces 68/70 would only be interlocked and attached with the first endwall section 62 (e.g., a platform).

In the example of a vane, a tension member 79 extends through the second airfoil piece 70 and secures the first and second endwall sections 62/64 together, thus trapping the airfoil pieces 68/70 there between. In this example, the tension member 79 includes a rod 79a with a threaded end that is received into a threaded boss 79b. Alternatively, rather than the threaded boss 79b, the rod 79a could extend through the first endwall section 62 and be secured with a nut. In another alternative, the rod 79a could be split such that one rod piece is received through the first endwall section 62 and another rod piece is received through the second endwall section 64 such that male/female threaded ends of the rod pieces meet somewhere between the endwall sections 62/64. In any of these examples, the rod 79a may also extend through the trunnions 61 or be comprised of the trunnions 61. As will be appreciated, more than one tension member 79 could also be used.

The first endwall section 62 includes sidewalls 62a and a bottomwall 62b. Similarly, the second endwall section 64 includes sidewalls 64a and a bottomwall 64b. The walls 62a/62b and the walls 64a/64b define respective cavities 80/82 in the first and second endwall sections 62/64. The first ends 72/74 of the airfoils pieces 68/70 are disposed in, and thus interlock with, the cavity 80 in the first endwall section 62. The second ends 76/78 of the airfoil pieces 68/70 are disposed in, and thus interlock with, the cavity 82 in the second endwall section 64.

One or both of the cavities 80/82 may be divided into a plurality of sub-cavities. In the illustrated example, ribs 84/86 divide the cavity 80 into sub-cavities 80a/80b/80c. Sub-cavity 80a is a forward-most sub-cavity and sub-cavity 80c is an aft-most cavity. Sub-cavity 80b is intermediate of sub-cavities 80a/80c. Similarly, a rib 88 divides the cavity 82 into sub-cavities 82a/82b.

The sub-cavities 80a/80b/80c and 82a/82b may serve several purposes in the airfoil 60, such as but not limited to, supporting and retaining the airfoil pieces 68/70, supporting and retaining other structures in the airfoil 60 such as bias members or baffles, and defining passages for guiding cooling bleed air in the airfoil 60. For instance, the ribs 84/88 in this example may support the airfoil pieces 68/70, and the wall 84 may include a cooling hole 84a for guiding cooling bleed air provided through the trunnion 61. In this regard, one or both of the first and second airfoil pieces 68/70 may have internal passages 90 such that the airfoil pieces 68/70 are hollow to convey the cooling bleed air flow.

The airfoil 60 may also include a bias member 92. As an example, the bias member 92 is a spring. The bias member 92 is located between the first airfoil piece 68 and one of the first or second endwall sections 62/64. In this example, the bias member 92 is between the first airfoil piece 68 and the first endwall section 62, although the bias member 92 could alternatively be between the first airfoil piece 68 and the second endwall section 64, or an additional bias member 92 could be provided between the first airfoil piece 68 and the second endwall section 64.

The bias member 92 is disposed in the cavity 80 of the first endwall section 62. In this example, the bias member 92 is in the sub-cavity 80a. The sub-cavity 80a retains the bias member 92. For instance, the sub-cavity 80a is sized in accordance with the size of the bias member 92 such that the bias member 92 fits securely in the first endwall section 62. This retention of the bias member 92 facilitates maintaining the position of the bias member 92 for proper function.

The bias member 92 maintains a compression force on the airfoil piece 68. In particular, during engine operation there is thermal growth and contraction of the airfoil piece 68, adjacent airfoil piece 70, the first endwall section 62, and the second endwall section 64. Where dissimilar materials are used for these components, such as metal alloys for the endwall sections 62/64 and airfoil piece 70 and ceramic for the airfoil piece 68, there may be a thermal growth/contraction mismatch. The bias member 92 maintains compression force over the range of thermal growths and contractions during engine operation. For instance, the thermal growths and contractions can readily be determined from defined maximum and minimum temperatures during engine operation in order to calculate or estimate a thermal growth/contraction mismatch distance, including the effect of manufacturing tolerances. The bias member 92 is configured to provide the compression force over at least that distance.

The airfoil pieces 68/70 and the endwall sections 62/64 also may also include features that facilitate making an aerodynamic connection between the airfoil pieces 68/70 and the endwall sections 62/64. For example, the first airfoil piece 68 includes interface features 68a/68b, the second airfoil piece 70 includes interface features 70a/70b, the first endwall section 62 includes interface feature 62c, and the second endwall section 64 includes interface feature 64c.

The interface features 68a/70a of the airfoil pieces 68/70 connect with the interface feature 62c of the first endwall section 62 such that the exterior airfoil surfaces of the airfoil pieces 68/70 are substantially flush with the exterior endwall surface of the first endwall section 62. Similarly, the interface features 68b/70b of the airfoil pieces 68/70 connect with the interface feature 64c of the second endwall section 64 such that the exterior airfoil surfaces of the airfoil pieces 68/70 are substantially flush with the exterior endwall surface of the second endwall section 64. The interface features 68a/68b and 70a/70b of the respective airfoil pieces 68/70 are complimentary to the interface features 62c/64c of the respective endwall sections 62/64. For instance, one of the interface features is a shoulder and the complimentary interface feature is a lip that abuts the shoulder such that the exterior surfaces are substantially flush. In the example shown, the interface features 68a/68b and 70a/70b of the respective airfoil pieces 68/70 are shoulders and the interfaces features 62c/64c of the respective endwall sections 62/64 are complimentary lips. Conversely, a lip or lips could be on the airfoil pieces 68/70 and a shoulder or shoulders on the endwall sections 62/64.

The materials of which the airfoil pieces 68/70 are formed of may be selected to enhance the performance of the airfoil 60. For example, the airfoil pieces 68/70 may be formed of a ceramic or of a metal. In the example shown, the first airfoil piece 68 is ceramic and the second airfoil piece 70 is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil pieces 68/70 can be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

As can be appreciated from this disclosure, the airfoil 60 has relatively few components and is thus easy to assemble. Moreover, different locations of the airfoil profile and can formed of different materials that are tailored to the environmental conditions at the particular locations.

Figure 3:
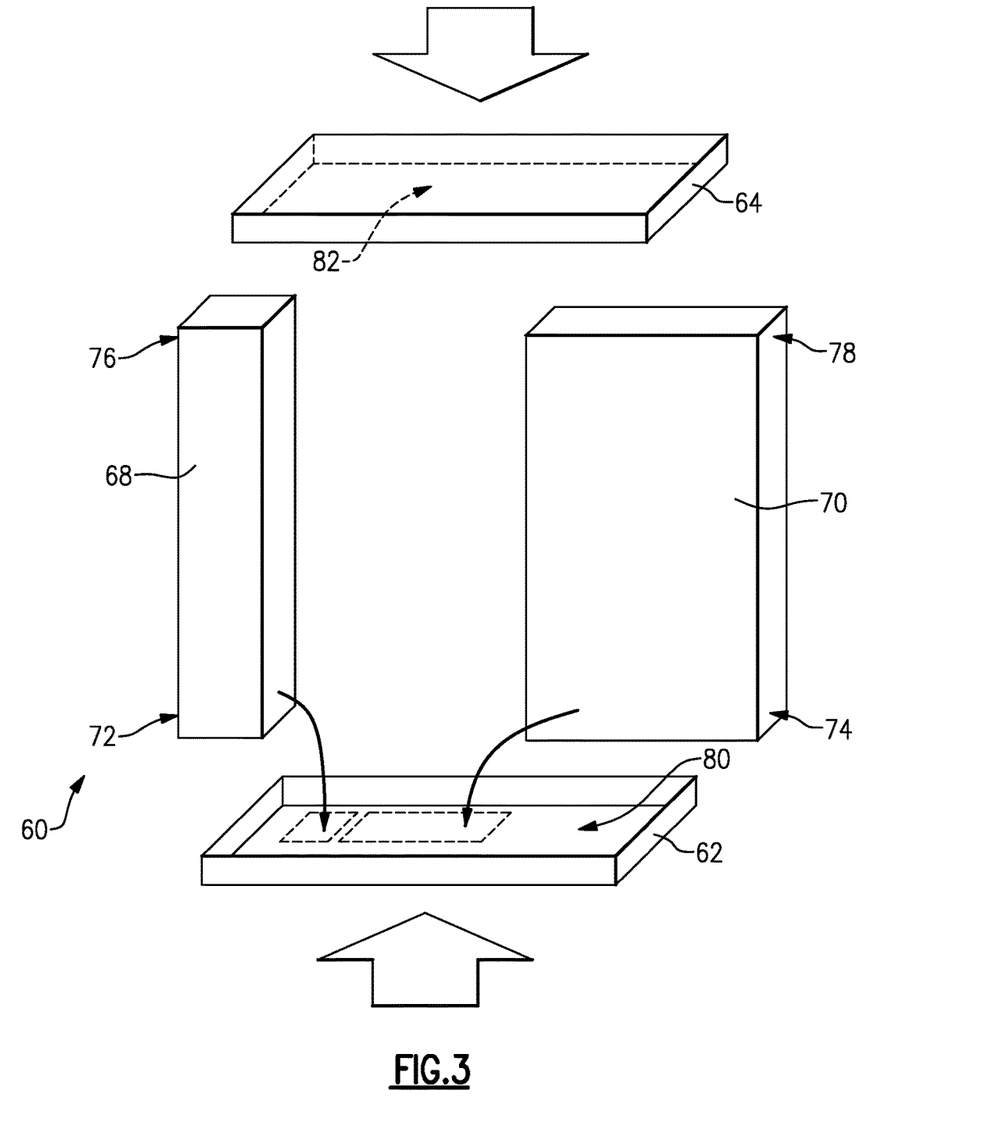
FIG. 3 illustrates an exploded view of an airfoil.

FIG. 3 illustrates an exploded view of the airfoil 60 and method of assembling the airfoil 60. The method of assembly may include securing the first and second airfoil pieces 68/70 between the first and second endwall sections 62/64 to form the airfoil section 66. The first and second airfoil pieces 68/70 are secured between the first and second endwall sections 62/64 by interlocking the first ends 72/74 with the first endwall section 62. For instance, the first ends 72/74 are inserted into the cavity 80 in the first endwall section 62. Similarly, the second ends 76/78 are interlocked with the second endwall section 64 by inserting the second ends 76/78 into the cavity 82 in the second endwall section 62.

Figure 4:
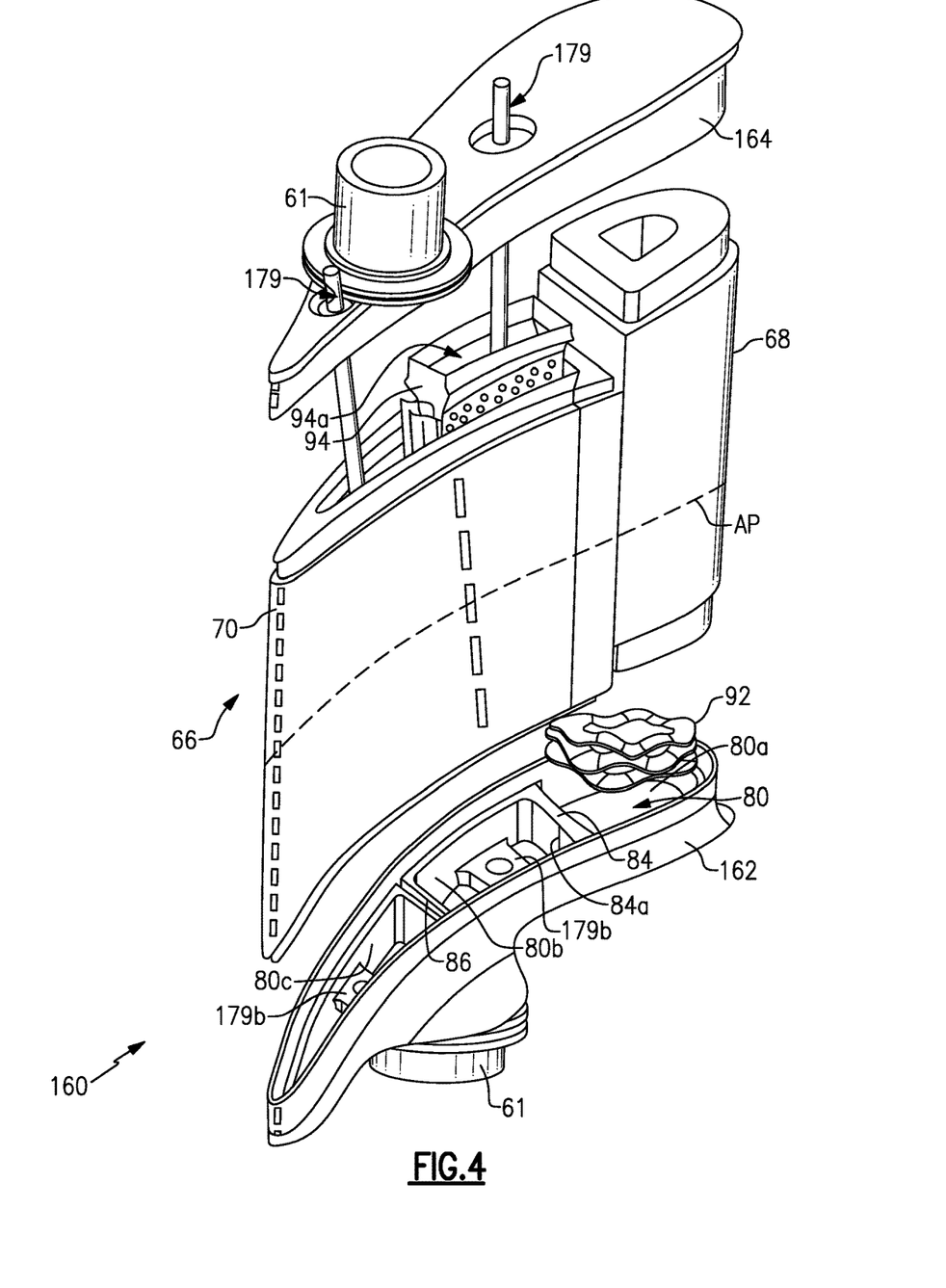
FIG. 4 illustrates an exploded view of another example airfoil that has two tension members.

FIG. 4 illustrates another example airfoil 160. In this disclosure, like reference numerals designate like elements where appropriate and reference numerals with the addition of one-hundred or multiples thereof designate modified elements that are understood to incorporate the same features and benefits of the corresponding elements. In FIG. 4 the endwall sections 162/164 are highly contoured and represent a variable vane configuration. Alternatively, the endwall sections 162/164 may be configured as a platform of a static vane.

In this example, the first and second airfoil pieces 68/70 are secured between first and second endwall sections 162/164. Two tension members 179 are used to secure the endwall sections 162/164 together. One of the tension members 179 extends through the second airfoil piece 70 and sub-cavity 80*b* of the first endwall piece 162. The second of the tension members 179 is farther aft and also extends through the second airfoil piece 70. However, the second tension member 179 extends through the sub-cavity 80*c*. The tension members 179 threadingly engage respective threaded bosses 179*b*. Alternatively, rather than the threaded bosses 179*b*, one or both of the rods 179 could extend through the first endwall section 162 and be secured with a nut. In another alternative, the rod 179 could be split such that one rod piece is received through the first endwall section 162 and another rod piece is received through the second endwall section 164 such that male/female threaded ends of the rod pieces meet somewhere between the endwall sections 162/164. In any of these examples, the rod 179 may also extend through the trunnions 61, or the trunnions themselves may meet somewhere between endwall sections and serve as the tension member.

In this example, the airfoil 160 also includes a baffle 94 disposed in the second airfoil member 70. The baffle 94 is perforated. Cooling bleed air may be provided to the internal cavity portion 94*a* of the baffle 94. The perforations serve to distribute the cooling bleed air flow to the inside surfaces of the second airfoil piece 70. In this example, the tension member 179 extends through the internal cavity portion 94*a* of the baffle 94.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section defining an airfoil profile;
    a first endwall section with which the airfoil section is attached;
    first and second airfoil pieces, the first airfoil piece forming a portion of the airfoil profile and the second airfoil piece forming another, different portion of the airfoil profile, the first and second airfoil pieces including respective first ends, the first ends interlocking with the first endwall section such that the first and second airfoil pieces are retained with the first endwall section; and
    a bias member between the first airfoil piece and the first endwall section, wherein the first endwall section includes a sub-cavity retaining a bias member.

2. The airfoil as recited in claim 1, further comprising a second endwall section, the first and second airfoil pieces include respective second ends opposed from the respective first ends, and the second ends interlock with the second endwall section.

3. The airfoil as recited in claim 1, wherein the first endwall section includes a cavity, and the first ends are disposed in the cavity.

4. The airfoil as recited in claim 3, wherein the cavity is divided into a plurality of sub-cavities, and the respective first ends are disposed in different sub-cavities.

5. The airfoil as recited in claim 1, wherein the first airfoil piece forms a leading end of the airfoil profile, and the second airfoil piece forms at least one of a trailing end, a pressure side, or a suction side of the airfoil profile.

6. The airfoil as recited in claim 1, wherein one of the first airfoil piece or the first endwall section includes a lip and the other of the first airfoil piece or the first endwall section includes a shoulder that abuts the lip such that an exterior airfoil surface of the first airfoil piece is substantially flush with an exterior endwall surface of the first endwall section.

7. The airfoil as recited in claim 1, further comprising a second endwall section and a tension member extending through one of the first or second airfoil pieces, the tension member securing the first and second endwall sections together.

8. The airfoil as recited in claim 1, further comprising a second endwall section and plurality of tension members, each tension member extending through one of the first or second airfoil pieces, the tension members securing the first and second endwall sections together.

9. The airfoil as recited in claim 1, wherein the first airfoil piece is formed of ceramic or a ceramic matrix composite and the second airfoil piece is formed of metal.

10. The airfoil as recited in claim 9, wherein the first airfoil piece forms a leading end of the airfoil profile, the second airfoil piece forms at least one of a trailing end, a pressure side, or a suction side of the airfoil profile, and the first and second airfoil pieces are each hollow.

11. The airfoil as recited in claim 1, further comprising a second endwall section, and wherein the first and second airfoil pieces include respective second ends opposed from the respective first ends, the second ends interlock with the second endwall section, the first endwall section includes a cavity, the cavity is divided into a plurality of sub-cavities, the respective first ends are disposed in different sub-cavities, the first airfoil piece forms a leading end of the airfoil profile, the second airfoil piece forms at least one of a trailing end, a pressure side, or a suction side of the airfoil profile, the first airfoil piece is formed of ceramic, the second airfoil piece is formed of metal, and the first and second airfoil pieces are each hollow.

12. A gas turbine engine comprising:
    a compressor section;
    a combustor in fluid communication with the compressor section; and
    a turbine section in fluid communication with the combustor,
    at least one of the turbine section or the compressor section including an airfoil having an airfoil section defining an airfoil profile,
        a first endwall section with which the airfoil section is attached,
        first and second airfoil pieces, the first airfoil piece forming a portion of the airfoil profile and the second airfoil piece forming another, different portion of the airfoil profile, the first and second airfoil pieces including respective first ends, the first ends interlocking with the first endwall section such that the first and second airfoil pieces are retained with the first endwall section a bias member between the first airfoil piece and the first endwall section, wherein the first endwall section includes a sub-cavity retaining the bias member.

13. The gas turbine engine as recited in claim 12, further comprising a second endwall section, and wherein the first and second airfoil pieces include respective second ends opposed from the respective first ends, the second ends interlocking with the second endwall section.

14. The gas turbine engine as recited in claim 12, wherein the first airfoil piece is formed of ceramic or ceramic matrix composite and the second airfoil piece is formed of metal.

15. The gas turbine engine as recited in claim 14, wherein the first airfoil piece forms a leading end of the airfoil profile, the second airfoil piece forms at least one of a trailing end, a pressure side, or a suction side of the airfoil profile, and the first and second airfoil pieces are each hollow.

16. The gas turbine engine as recited in claim 12, wherein one of the first airfoil piece or the first endwall section includes a lip and the other of the first airfoil piece or the first endwall section includes a shoulder that abuts the lip such that an exterior airfoil surface of the first airfoil piece is substantially flush with an exterior endwall surface of the first endwall section.

17. A method of assembling an airfoil, the method comprising:

securing first and second airfoil pieces with at least a first endwall section to form an airfoil section, wherein the airfoil section has an airfoil profile, the first airfoil piece defines a portion of the airfoil profile and the second airfoil piece defines another, different portion of the airfoil profile, and the first and second airfoil pieces include respective first ends, wherein the securing includes interlocking the first ends with the first endwall section, and wherein there is a bias member between the first airfoil piece and the first endwall section, and the first endwall section includes a sub-cavity retaining the bias member.

\* \* \* \* \*